United States Patent [19]

Berkley

[11] 4,436,202
[45] Mar. 13, 1984

[54] REUSABLE ENVELOPE

[75] Inventor: E. Bertram Berkley, Kansas City, Mo.

[73] Assignee: Tension Envelope Corporation, Kansas City, Mo.

[21] Appl. No.: 420,127

[22] Filed: Sep. 20, 1982

[51] Int. Cl.³ .............................................. B65D 85/48
[52] U.S. Cl. .................................... 206/455; 206/456; 229/70; 229/72
[58] Field of Search ....................... 206/216, 455, 456; 229/68 R, 70, 71, 72

[56] References Cited

U.S. PATENT DOCUMENTS

| | | | |
|---|---|---|---|
| 498,761 | 6/1893 | Becker | 229/71 |
| 646,638 | 1/1900 | Cutler | 229/68 |
| 2,055,716 | 9/1936 | Berkowitz | 229/71 |
| 2,732,064 | 1/1956 | Quackenbush | 206/216 |
| 2,887,327 | 5/1959 | Tucker | 229/70 |
| 3,288,351 | 11/1966 | Benz, Jr. | 229/71 |
| 3,302,861 | 2/1967 | Heirsteiner | 229/70 |
| 3,315,878 | 4/1967 | Heirsteiner | 229/72 |
| 3,321,172 | 5/1967 | Miller | 229/71 |
| 3,576,972 | 5/1971 | Wood | 229/71 |
| 3,680,768 | 8/1972 | Warren | 229/72 |
| 4,047,661 | 9/1977 | Klein | 229/72 |
| 4,221,161 | 9/1980 | Hurt | 229/72 |

*Primary Examiner*—William T. Dixson, Jr.
*Assistant Examiner*—David T. Fidei
*Attorney, Agent, or Firm*—Litman, Day & McMahon

[57] ABSTRACT

A reusable envelope including a back panel with opposite side edges and a front panel integrally connected to the back panel and demarcated therefrom by a fold line. The back and front panels each have inner and outer surfaces and form a pocket between their respective inner surfaces. A pair of opposed side flaps are each attached to a respective back panel side edge and to the front panel outer surface. Each side flap includes an extension having a secured portion secured to the front panel outer surface, an unsecured portion and an extension side edge. The extension side edges are positioned in opposed, spaced relationship. A pair of closures are each formed between the front panel outer surface and a respective extension unsecured portion. Each closure is adapted to slidably receive therein a respective side margin of a card insert which is thereby retained adjacent the front panel.

9 Claims, 6 Drawing Figures

REUSABLE ENVELOPE

BACKGROUND OF THE INVENTION

1. Field of the Invention

This invention relates to envelopes and more particularly to a reusable envelope for X-ray prints adapted to receive a removable card insert.

2. Description of the Prior Art

X-ray negatives are typically placed in envelopes for protection from scratching and other damage. Typical prior art envelopes include a pair of panels forming a pocket therebetween for receiving the X-ray negatives. One of the panels may include an area designated by a printed form thereon for receiving information relating to the enclosed X-ray negatives, including the identities of the patient and his or her physician or dentist. The information on the envelope allows a person to readily determine the nature of its contents without having to remove the enclosed X-ray negatives whereby filing and handling of large quantities of X-ray negatives is facilitated. Since the information was usually written directly on one of the panels of such envelopes, they were normally disposed of after a single use. The cost of an envelope for each X-ray session was therefor factored into the cost thereof. The contribution of the envelope to the cost of an X-ray session was not insignificant, because relatively heavy and expensive paper stock was used for forming X-ray envelopes in order to provide adequate protection of the enclosed X-ray negative and to facilitate filing and handling.

SUMMARY OF THE INVENTION

In the practice of the present invention, a reusable envelope is provided which is adapted to removably receive a card insert with opposite side edges. The envelope includes a back panel with opposite side edges and a front panel with an outer surface. The front panel is integrally attached to the back panel and demarcated therefrom by a fold line. A pocket is formed between the back and front panels. A pair of opposed side flaps are each attached to a respective back panel side edge and to the front panel outer surface. Each side flap includes an extension extending therefrom and having a secured portion secured to the front panel outer surface and an unsecured portion. Each extension terminates in an extension side edge, the extension side edges being in opposed, spaced relationship. A pair of closures are each formed between the front panel outer surface and a respective side flap unsecured portion. Each closure is adapted to slidably receive therein a respective card insert side margin whereby the card insert is removably retained adjacent the front panel outer surface.

Economy in use is provided because the card insert may be removed from the reusable envelope by slidably withdrawing its side margins from the respective enclosures without damaging the envelope, which may then receive another card insert accompanying another set of X-ray negatives placed in the pocket. Simplicity in manufacture is permitted since the reusable envelope of the present invention may be cut from one-piece envelope blanks, folded and adhesively secured in the desired configuration.

The principle objects of the present invention are: to provide a reusable envelope which is adapted to removably receive a card insert; to provide such an envelope wherein information on the card insert is visible between spaced extension side edges; to provide such an envelope with side flaps having extensions forming closures with a front panel of the envelope; to provide such an envelope wherein opposite side margins of the card insert are removably retained in the respective closures; to provide such an envelope wherein the extensions have extension side edges in opposed spaced relationship; to provide such an envelope wherein information on the card insert is visible between the extension side edges; to provide such an envelope which may be formed from a one-piece envelope blank; and to provide such an envelope which is economical to manufacture, efficient in use, capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein, however it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
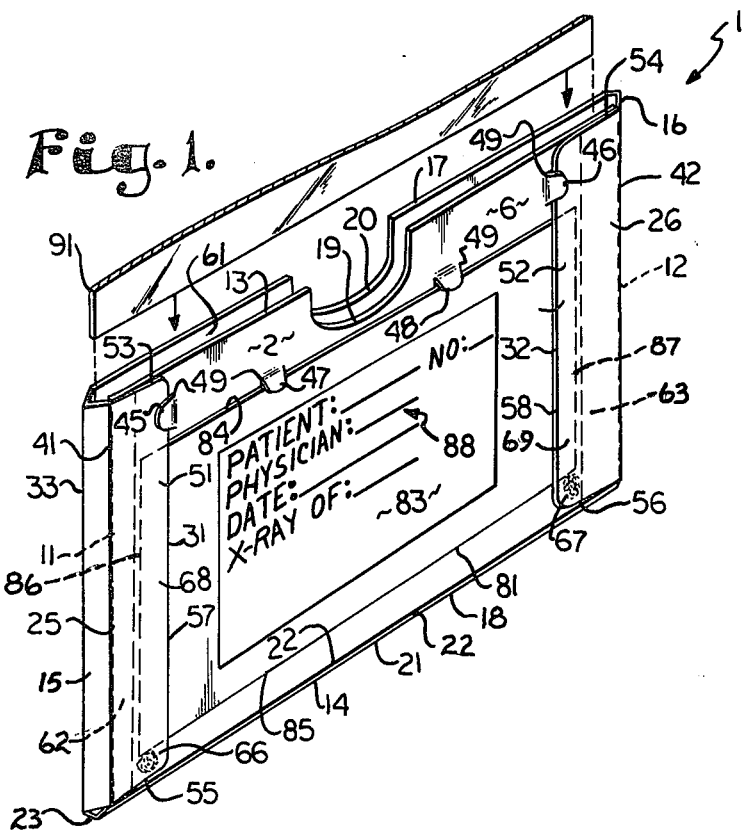
FIG. 1 is a perspective view of a reusable envelope embodying the present invention and showing a portion of an X-ray negative being inserted into a pocket thereof.
Figure 3:
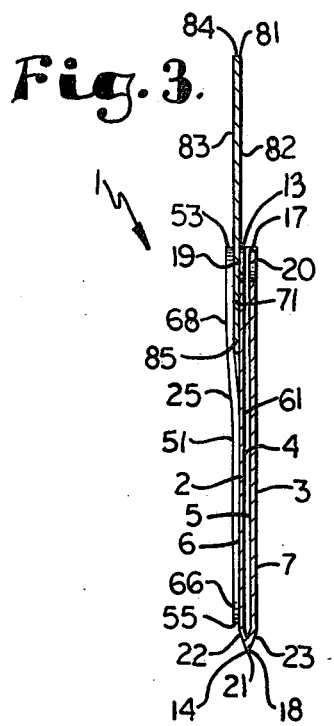
FIG. 3 is a vertical, cross-sectional view of the envelope taken generally along line 3—3 in FIG. 2.
Figure 2:
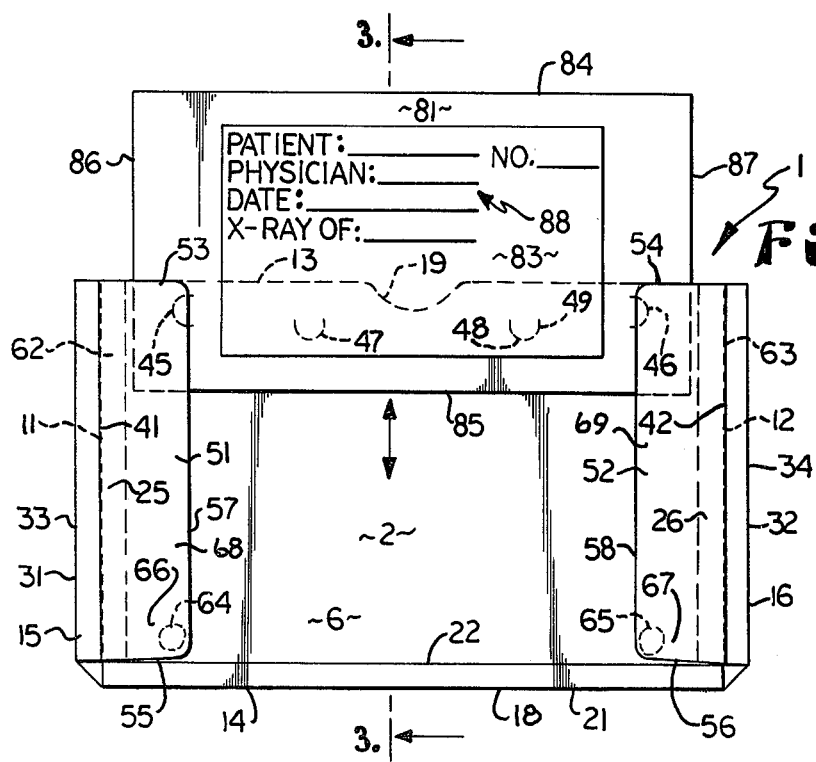
FIG. 2 is a front elevational view of the envelope showing a card insert with side margins partially inserted into respective closures.

For purposes of description herein, the terms "upper," "lower," "right," "left," "rear," "front," "vertical," "horizontal," and derivatives thereof shall relate to the invention as oriented in FIG. 2, however, it is to be understood that the invention may assume various alternative orientations, except where expressly specified to the contrary.

Referring to the drawings in more detail, the reference numeral 1 generally indicates a reusable envelope embodying this invention. The reusable envelope 1 comprises a front and a back body panel 2 and 3 respectively having inner surfaces 4 and 5 respectively and outer surfaces 6 and 7 respectively.

The front body panel 2 includes opposed side edges 11 and 12 and upper and lower edges 13 and 14 respectively. The back body panel 3 includes opposed side edges 15 and 16 and upper and lower edges 17 and 18 respectively. The body panels 2 and 3 are integrally connected and demarcated by a lower edge fold line 21 extending along their lower edges 14 and 18. The body panels 2 and 3 also have respective lower fold lines 22 and 23 in spaced relation from and substantially parallel to the lower edge fold line 21. The front and back body panel upper edges 13 and 17 respectively include respective rounded notches 19 and 20.

A pair of opposed side flaps 25 and 26 exhibit side edges 31 and 32 respectively and are integrally connected to the back body panel 3 and demarcated therefrom by respective side fold lines 33 and 34 at the back panel side edges 15 and 16 and at the side flap edges 31 and 32. The back body panel 3 includes an opposed pair of fold lines 41 and 42 in close-spaced relation from and substantially parallel to the side edges 31 and 32 respectively. The side flaps 25 and 26 include respective fold lines 43 and 44 in spaced relation from and substantially parallel to the side edge fold lines 33 and 34 respectively.

The front body panel 3 includes a pair of laterally extending cut-outs or tabs 45 and 46 positioned in proximity to the front panel upper edge 13 and spaced slightly inwardly from the front panel side edges 11 and 12 respectively. The front body panel 2 also includes a pair of downwardly extending cut-outs or tabs 47 and 48 positioned between the front panel rounded notch 19 and the laterally extending cut-outs 45 and 46 respectively. The cut-outs 45, 46, 47 and 48 are each formed by respective slits 49 extending through the front panel 2 and having substantially semi-circular configurations.

A pair of opposed extensions 51 and 52 are integral with and extend from the side flaps 25 and 26 respectively and exhibit upper edges 53 and 54 and lower edges 55 and 56 respectively. The extensions 51 and 52 terminate in respective extension side edges 57 and 58.

In forming the reusable envelope 1, the body panels 2 and 3 are folded along the lower edge fold line 21 whereby their respective inner surfaces 4 and 5 are positioned in opposing relationship and form a pocket 61 therebetween. The front panel outer surface 6 has seal gum or adhesive areas 62 and 63 thereon adjacent the front panel side edges 11 and 12 respectively. The adhesive areas 62 and 63 connect the side flaps 25 and 26 to the front panel outer surface 6 with the side flaps 25 and 26 folded relative to the back body panel 3 along the side edge fold lines 33 and 34 respectively, thereby securing the reusable envelope 1 in its desired configuration with the front and back body panels 2 and 3 positioned adjacent each other. The extensions 51 and 52 are connected to the front panel outer surface 6 by seal gum or adhesive spots 64 and 65 adjacent the respective extension lower edges 55 and 56 respectively. Respective extension secured portions 66 and 67 are thereby defined at the adhesive spots 64 and 65. The extensions 51 and 52 also include respective extension unsecured portions 68 and 69 positioned above respective extension secured portions 66 and 67. A pair of closures 71 and 72 are formed by extension unsecured portions 68 and 69 respectively and the front body panel outer surface 6. The closures 71 and 72 are open along the extension upper edges 53 and 54 and along the extension side edges 57 and 58 adjacent the unsecured portions 68 and 69. The closures 71 and 72 are bounded by the side flaps 25 and 26 and by the adhesive spots 64 and 65 respectively. The extension side edges 57 and 58 are positioned in mutually opposed, spaced relationship.

Figure 4:
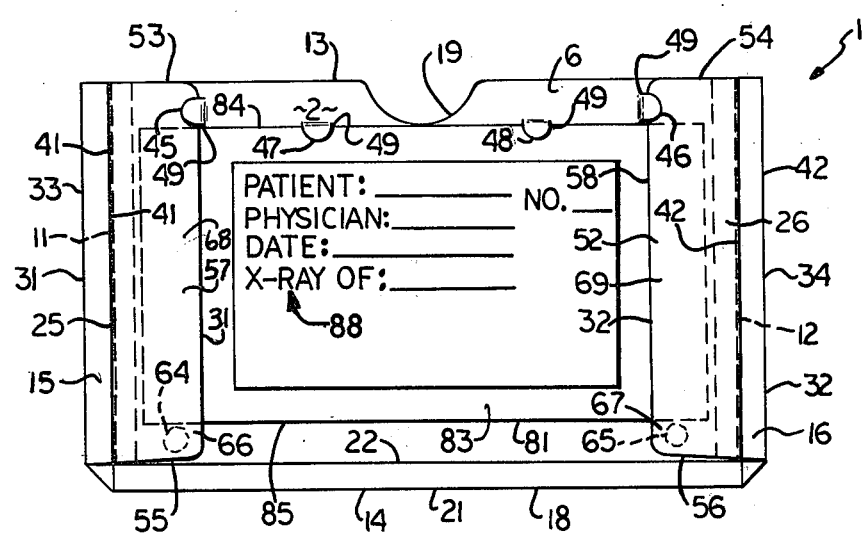
FIG. 4 is a front elevational view of the envelope showing the card insert removably retained adjacent a front panel outer surface of the envelope.
Figure 5:
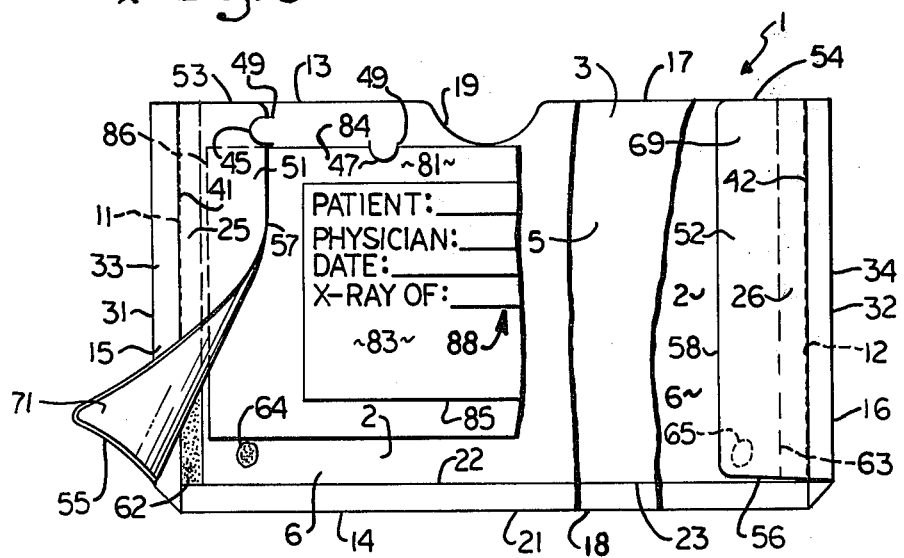
FIG. 5 is a front elevational view of the envelope with a side flap and an extension partially separated from the front panel outer surface and with portions thereof broken away to reveal internal construction.
Figure 6:
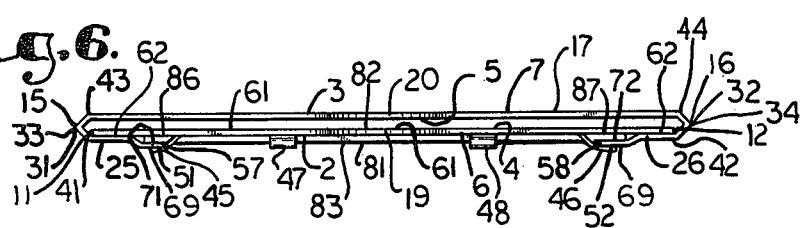
FIG. 6 is a top plan view of the envelope.

In use, the closures 71 and 72 are adapted to retain a card insert 81 having an inner and an outer surface 82 and 83 respectively, upper and lower edges 84 and 85 respectively and opposed side margins 86 and 87. The closures 71 and 72 are adapted to slidably receive respective card insert side margins 86 and 87 therein whereby the card insert 81 is removably retained with its inner surface 82 in opposed relationship with respect to the front panel outer surface 6. The card insert outer surface 83 contains visually perceptible identifying information 88 thereon. Such information 88 may comprise, for example, a patient's name and number, an attending physician's name, the date, and a description of the X-ray subject matter. With the card insert 81 removably attached to the reusable envelope 1 as shown in FIG. 4, the identifying information 88 is visible between the spaced extension side edges 57 and 58.

With the card insert 81 thus positioned, the laterally extending cut-outs 45 and 46 are manually lifted outwardly from the front body panel outer surface 6 and placed over the extension unsecured portion 68 and 69 respectively at their extension side edges 57 and 58 respectively adjacent the card insert upper edge 84. The downwardly extending cut-outs 47 and 48 are similarly pried outwardly from the front body panel outer surface 6 and placed over the card insert 81 at its upper edge 84. With the cut-outs 45, 46, 47 and 48 thus positioned, the extension unsecured portions 68 and 69 and the card insert 81 will be retained against the front body panel outer surface 6 and will thus be less likely to catch on portions of adjacent reusable envelopes 1 as they are slid past one another, for instance in filing and retrieval operations on a shelf or in a file cabinet.

In the illustrated embodiment of the reusable envelope 1, the identifying information 88 refers to an X-ray negative 91 which may be removably inserted in the pocket 61. The X-ray negative 91 may be removed from the pocket 61 by grasping it at the rounded notches 19 and 20. If a plurality of X-ray negatives are placed in the pocket 61, the envelope 1 is adapted to bend along the fold lines 22, 23, 41, 43, 44 and 45 whereby the body panels 2 and 3 are spaced with respect to each other and the pocket 61 correspondingly expanded to accommodate the X-ray negatives.

When the X-ray negative 91 is no longer required to be stored in the reusable envelope 1, it may be removed and the card insert 81 containing the identifying information 88 concerning same may also be detached from the reusable envelope 1 by slidably withdrawing its side margins 86 and 87 from the respective closures 71 and 72. The reusable envelope 1 is thus adapted to receive another X-ray negative and card insert with identifying information thereon regarding the new X-ray card. Because removal of the card insert 81 does not damage the reusable envelope 1, it is anticipated that it may be reused a number of times.

The above described envelope construction permits simple, direct and rapid manufacture with a minimum of operational steps, and on conventional envelope folding equipment. The envelope 1 may be cut from a one-piece blank and the adhesive areas 62 and 63 and adhesive spots 64 and 65 applied on the front panel outer surface 6 of the envelope blank in a single operational step. The reusable envelope 1 is therefore relatively inexpensive to produce and capable of a relatively long operating life.

It is to be understood that while certain forms of this invention have been illustrated and described, it is not to be limited to these specific forms or arrangement of parts herein described and shown.

What is claimed and desired to secure by Letters Patent is:

1. An envelope for removably receiving and retaining a card insert with opposite side margins, which comprises:
   (a) an exposed front panel having an inner and an outer surface, an upper and a lower edge, and opposite side edges;
   (b) an exposed back panel having an inner and an outer surface, an upper and a lower edge, and opposite side edges; said back panel being integrally connected to said front panel and demarcated therefrom by a lower edge fold line along said front and back panel lower edges;
   (c) said back panel being folded along said lower edge fold line with respect to said front panel and positioned adjacent thereto;
   (d) said front and back panels forming a pocket therebetween open at said front and back panel upper edges;
   (e) a pair of opposed side flaps each having a respective side flap edge and each being integrally connected to said back panel and demarcated therefrom by a respective fold line along said side flap edge and a respective back panel side edge, each said side flap being attached to said front panel outer surface and positioned exteriorly with respect to said envelope;
   (f) a pair of extensions each attached to a respective side flap and extending inwardly therefrom; each said extension having a lower portion secured to said front panel outer surface and an unsecured upper portion;
   (g) each said extension including an extension inner side edge, said extension inner side edges being positioned in spaced, opposed relationship; and
   (h) a pair of closures each formed between said front panel outer surface and a respective extension unsecured portion; each said closure being adapted to slidably and releasably receive therein a respective said insert side margin whereby said card insert is removably retained adjacent said front panel outer surface and whereby said card insert is visible between said extension side edges.

2. The reusable envelope as set forth in claim 1 which includes:
   (a) each said extension having an upper edge;
   (b) each said closure being bounded by a respective side flap and a respective extension secured portion;
   (c) each said closure being open at a respective extension side edge adjacent said unsecured portion and at a respective extension upper edge.

3. The reusable envelope as set forth in claim 1 which includes:
   (a) said card insert having visually perceivable information thereon, said information being visible between said extensions with said card insert removably retained adjacent said front panel.

4. The reusable envelope as set forth in claim 1 which includes:
   (a) said front panel having a cut-out adapted for positioning over a portion of said card insert whereby said card insert is retained against said front panel.

5. The reusable envelope as set forth in claim 1 which includes:
   (a) said front panel having a pair of cut-outs each adapted for placement over a portion of a respective extention whereby said extension is retained against said front panel.

6. A reusable envelope for an X-ray negative and the like and for removably receiving a card insert with opposite side margins, which comprises:
   (a) an exposed front panel having an inner and an outer surface, an upper and a lower edge, and opposite side edges;
   an exposed back panel having an inner and an outer surface, an upper and a lower edge, and opposite side edges; said back panel being integrally connected to said front panel and demarcated therefrom by a lower edge fold line along said front and back panel lower edges;
   (c) said back panel being folded along said lower edge fold line with respect to said front panel and positioned adjacent thereto;
   (d) said front and back panels forming a pocket therebetween adapted for receiving said X-ray negative and the like;
   (e) a pair of opposed side flaps each having a respective side flap edge and being integrally connected to said back panel and demarcated therefrom by a respective fold line along said side flap edge and a respective back panel side edge, each said side flap being attached to said front panel outer surface and positioned exteriorly with respect to said envelope;
   (f) a pair of extensions each attached to a respective side flap and extending inwardly therefrom; each said extension having a lower portion secured to said front panel outer surface and an unsecured upper portion;
   (g) each said extension including an extension inner side edge, said extension inner side edges being positioned in spaced, opposed relationship;
   (h) a pair of closures each formed between said front panel outer surface and a respective extension unsecured portion; each said closure being adapted to slidably and removably receive therein a respective said insert side margin whereby said card insert is removably retained adjacent said front panel outer surface and whereby said card insert is visible between said extension inner side edges; and
   (i) retainer means for releasably retaining said extension unsecured portions against said front panel outer surface and said card insert side margins in said closures.

7. The reusable envelope as set forth in claim 6 which includes:
   (a) each said extension having an upper edge;
   (b) each said closure being bounded by a respective side flap and a respective extension secured portion;
   (c) each said closure being open at a respective extension side edge adjacent said unsecured portion and at a respective extension upper edge.

8. The reusable envelope as set forth in claim 6 wherein said retainer means includes:
   (a) said front panel having a cut-out adapted for positioning over a portion of said card insert whereby said card insert is retained against said front panel.

9. The reusable envelope as set forth in claim 6 wherein said retainer means includes:
   (a) said front panel having a pair of cut-outs each adapted for placement over a portion of a respective extention upper portion whereby said extension upper portion is retained against said front panel.

* * * * *